(12) United States Patent
Yamaguchi et al.

(10) Patent No.: US 9,222,572 B2
(45) Date of Patent: Dec. 29, 2015

(54) BELT DRIVING MECHANISM, BELT DRIVING APPARATUS, AND PULLEY

(71) Applicant: KYOCERA Document Solutions Inc., Osaka (JP)

(72) Inventors: Akihiro Yamaguchi, Osaka (JP); Masahiro Ueno, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 14/180,653

(22) Filed: Feb. 14, 2014

(65) Prior Publication Data

US 2014/0235384 A1 Aug. 21, 2014

(30) Foreign Application Priority Data

Feb. 21, 2013 (JP) ................................ 2013-031673

(51) Int. Cl.
*F16H 57/04* (2010.01)
*G03G 15/00* (2006.01)
*G03G 21/20* (2006.01)

(52) U.S. Cl.
CPC ........ *F16H 57/0416* (2013.01); *F16H 57/0489* (2013.01); *G03G 15/757* (2013.01); *G03G 21/206* (2013.01)

(58) Field of Classification Search
CPC ..... F16H 57/0415; F16H 55/38; F16H 55/36; F16H 57/0412; B65G 39/02
USPC .......................................................... 474/93
See application file for complete search history.

(56) References Cited

U.S. PATENT DOCUMENTS

| | | | | |
|---|---|---|---|---|
| 566,637 A * | 8/1896 | Wallis | ................ | F16H 57/0415 474/93 |
| 566,638 A * | 8/1896 | Wallis | .................... | F16H 55/38 474/93 |
| 980,744 A * | 1/1911 | Bentley | ............... | F16H 57/0415 188/218 R |
| 1,174,357 A * | 3/1916 | Scherer | ............... | F16H 57/0415 295/11 |
| 1,334,511 A * | 3/1920 | Williams | ................ | F16H 55/38 474/93 |
| 1,385,396 A * | 7/1921 | Rayburn | ................ | F16H 55/38 109/9 |
| 1,400,671 A * | 12/1921 | Fischer | ................... | F16H 55/38 474/93 |
| 1,433,828 A * | 10/1922 | Kimble | ................... | F16H 55/36 123/41.65 |
| 1,472,049 A * | 10/1923 | Clark | ..................... | B65G 17/00 110/269 |
| 1,564,399 A * | 12/1925 | Andrews | ................ | F16H 55/36 474/93 |

(Continued)

FOREIGN PATENT DOCUMENTS

DE 40 21 002 1/1992
JP 55-46771 4/1980

(Continued)

*Primary Examiner* — Henry Liu
(74) *Attorney, Agent, or Firm* — Wenderoth, Lind & Ponack, L.L.P.

(57) ABSTRACT

A belt driving mechanism includes a plurality of pulleys and a belt wound around the pulleys and made of a metallic material. The pulleys include a driving pulley and a driven pulley. At least one of the pulleys includes an air supply portion. The air supply portion supplies an air from the interior of at least one of the pulleys toward the belt wound around the pulleys.

3 Claims, 9 Drawing Sheets

(56) References Cited

U.S. PATENT DOCUMENTS

| | | | | | |
|---|---|---|---|---|---|
| 1,629,154 | A | * | 5/1927 | De Ybarrondo | G03B 1/42 15/303 |
| 1,939,325 | A | * | 12/1933 | Teter | F16H 55/38 474/93 |
| 2,057,435 | A | * | 10/1936 | Austin | F16H 55/36 188/264 R |
| 2,163,736 | A | * | 6/1939 | Parker | B66D 1/7442 188/264 D |
| 2,295,029 | A | * | 9/1942 | Cooney | F16G 7/00 24/31 C |
| 2,391,642 | A | * | 12/1945 | Reed | F04B 19/16 198/523 |
| 2,430,024 | A | * | 11/1947 | Luaces | F16G 5/10 156/139 |
| 2,621,528 | A | * | 12/1952 | Luaces | F16G 5/10 156/139 |
| 2,842,974 | A | * | 7/1958 | Neumann | F16H 55/44 474/170 |
| 2,920,494 | A | * | 1/1960 | Dodwell | F16G 5/16 474/148 |
| 2,953,032 | A | * | 9/1960 | Ruess | F16H 55/56 188/264 R |
| 3,016,235 | A | * | 1/1962 | Cnudde | B65G 39/02 432/228 |
| 3,119,140 | A | * | 1/1964 | Sallet | F16H 7/02 15/309.1 |
| 3,229,424 | A | * | 1/1966 | Fairchok | B24B 21/14 165/47 |
| 3,356,133 | A | * | 12/1967 | Touze | C23D 5/00 165/122 |
| 3,788,155 | A | * | 1/1974 | Cigala | F16H 55/48 474/177 |
| 3,826,306 | A | * | 7/1974 | Marsh | F16H 57/0415 165/47 |
| 3,943,785 | A | * | 3/1976 | Percifield | A01D 34/6806 474/171 |
| 3,971,263 | A | * | 7/1976 | Beaudoin et al. | F16H 55/563 474/12 |
| 4,509,933 | A | * | 4/1985 | Miranti, Jr. | F16H 55/36 474/188 |
| 5,214,472 | A | | 5/1993 | Czuprynski | |
| 5,417,617 | A | * | 5/1995 | Milton | F16H 55/171 474/205 |
| 5,490,814 | A | * | 2/1996 | Whitenight | F16H 55/49 474/188 |
| 5,887,576 | A | * | 3/1999 | Wheeler, Jr. | F02B 33/40 123/559.1 |
| 6,267,700 | B1 | * | 7/2001 | Takayama | F02B 61/02 474/144 |
| 6,695,581 | B2 | * | 2/2004 | Wasson | F04D 29/282 310/153 |
| 6,938,508 | B1 | * | 9/2005 | Saagge | F16H 9/18 192/113.23 |
| 2003/0013568 | A1 | * | 1/2003 | Rivin | F16G 1/00 474/237 |
| 2005/0255951 | A1 | * | 11/2005 | Greenwood | F04D 13/021 474/93 |
| 2011/0293329 | A1 | | 12/2011 | Konishi | |

FOREIGN PATENT DOCUMENTS

| | | |
|---|---|---|
| JP | 02-118248 | 5/1990 |
| JP | 06-049848 | 7/1994 |
| JP | 2008-291871 | 12/2008 |
| JP | 2011-069452 | 4/2011 |
| JP | 2011-248303 | 12/2011 |
| KR | 10-2012-0061672 | 6/2012 |

\* cited by examiner

BELT DRIVING MECHANISM, BELT DRIVING APPARATUS, AND PULLEY

CROSS-REFERENCE TO RELATED APPLICATION

This application is based upon and claims the benefit of priority from Japanese Patent Application(s) No. 2013-031673 filed on Feb. 21, 2014, the entire contents of which are incorporated herein by reference.

BACKGROUND

The present invention relates to a belt driving mechanism.

A belt driving apparatus such as a printer or a multifunction peripheral is provided with a rotation delivery mechanism for delivering rotational driving power, e.g., a belt driving mechanism. The belt driving mechanism includes a driving pulley, a driven pulley and an endless belt wound around the driving pulley and the driven pulley. It is required that the belt driving mechanism can accurately perform belt driving control. In contrast, it has been proposed that a belt is formed by a metallic material having high rigidity.

For example, a laser printer as a belt driving apparatus includes a photosensitive drum. An output shaft of the driven pulley of a belt driving mechanism is connected to a shaft member of the photosensitive drum. Rotational driving power is delivered from a driving pulley to the photosensitive drum through a metal belt and a driven pulley. The photosensitive drum is rotated and controlled by the belt driving mechanism.

SUMMARY

A belt driving mechanism according to one aspect of the present disclosure includes a plurality of pulleys and a belt wound around the pulleys and made of a metallic material. The pulleys include a driving pulley and a driven pulley. At least one of the pulleys includes an air supply portion. The air supply portion supplies an air from the interior of at least one of the pulleys to the belt wound around the pulleys.

A belt driving apparatus, comprising the belt driving mechanism.

A pulley which a metallic belt is wound around, wherein the pulley includes an air supply portion for supplying an air from the interior of the pulley toward the belt wound around the pulley.

DETAILED DESCRIPTION

First Embodiment

Laser Printer

Figure 1:
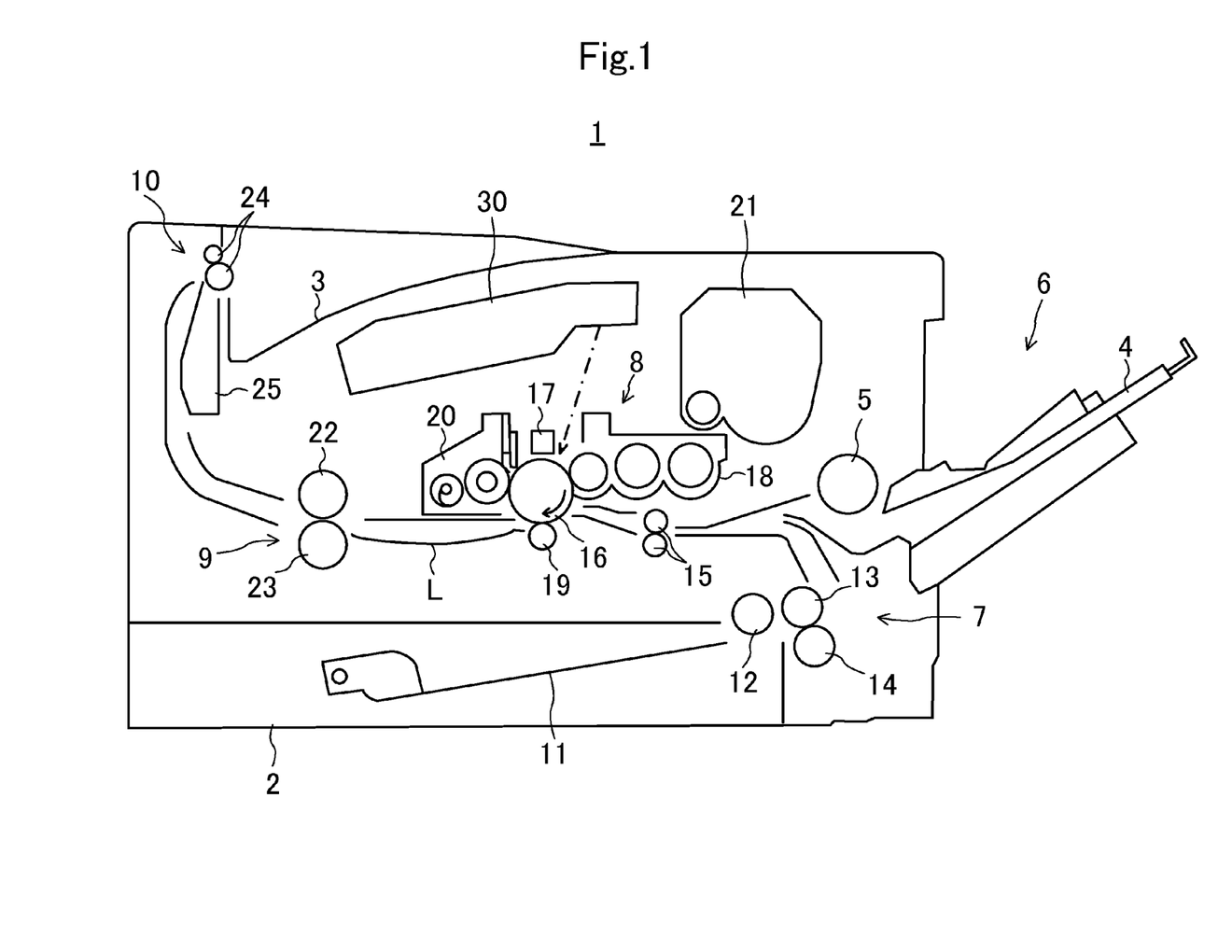
FIG. 1 is a sectional view showing a schematic configuration of a belt driving apparatus according to an embodiment.

FIG. 1 is a sectional view showing a schematic configuration of a laser printer 1 as a belt driving apparatus according to an embodiment.

As shown in FIG. 1, the laser printer 1 includes a box-shaped printer body 2, a manual insertion paper feeding unit 6, a cassette paper feeding unit 7, an image forming unit 8, a fixing unit 9 and a paper discharge unit 10. The laser printer 1 is configured to, while conveying a paper along a conveying path L within the printer body 2, form an image on the paper based on image data transmitted from a terminal or the like not shown.

The manual insertion paper feeding unit 6 includes a manual insertion tray 4 installed in one side portion of the printer body 2 so as to be opened and closed, and a manual insertion paper feeding roller 5 rotatably installed within the printer body 2.

The cassette paper feeding unit 7 is installed in the bottom portion of the printer body 2. The cassette paper feeding unit 7 includes a paper feeding cassette 11 for accommodating a plurality of papers overlapping with one another, a pick roller 12 for picking out the papers existing within the paper feeding cassette 11 one by one, and a feed roller 13 and a retard roller 14 for separating the picked papers one by one and feeding the separated paper to the conveying path L.

The image forming unit 8 is installed above the cassette paper feeding unit 7 within the printer body 2. The image forming unit 8 includes a photosensitive drum 16 as an image carrier rotatably installed within the printer body 2, a charging unit 17 disposed around the photosensitive drum 16, a developing unit 18 disposed around the photosensitive drum 16, a transfer roller 19 disposed around the photosensitive drum 16, a cleaning unit 20 disposed around the photosensitive drum 16, a laser scanner unit (LSU) 30 as an optical scanner disposed above the photosensitive drum 16, and a tonner hopper 21. The photosensitive drum 16 is driven and controlled by a belt driving mechanism 40. Thus, the image forming unit 8 can form an image on the paper supplied from the manual insertion paper feeding unit 6 or the cassette paper feeding unit 7.

A pair of register rollers 15 for temporarily keeping the fed paper on standby and supplying the paper to the image forming unit 8 at a predetermined timing is installed in the conveying path L.

The fixing unit 9 is disposed at one side of the image forming unit 8. The fixing unit 9 includes a fixing roller 22 and a pressing roller 23 which are pressed against each other and are rotated together. The fixing unit 9 is configured to fix a tonner image, which is transferred from the image forming unit 8 to the paper, to the paper.

The paper discharge unit 10 is installed above the fixing unit 9. The paper discharge unit 10 includes a paper discharge tray 3, a pair of paper discharge rollers 24 for conveying the paper to the paper discharge tray 3, and a plurality of conveyance guide ribs 25 for guiding the paper to the paper discharge rollers 24. The paper discharge tray 3 is disposed in the upper portion of the printer body 2 and is formed in a concave shape.

If the laser printer 1 receives image data, the photosensitive drum 16 of the image forming unit 8 is rotationally driven and the surface of the photosensitive drum 16 is electrically charged by the charging unit 17.

Based on the image data, laser light is emitted from the laser scanner unit 30 toward the photosensitive drum 16. Due to the irradiation of the laser light, an electrostatic latent image is formed on the surface of the photosensitive drum 16. The electrostatic latent image formed on the photosensitive drum 16 is developed by the developing unit 18 and is visualized as a tonner image.

Thereafter, the paper is pressed against the surface of the photosensitive drum 16 by the transfer roller 19. Thus, the tonner image of the photosensitive drum 16 is transferred to the paper. The paper to which the tonner image is transferred is heated and pressed by the fixing roller 22 and the pressing roller 23 of the fixing unit 9. As a result, the tonner image is fixed to the paper.

<Belt Driving Mechanism>

Next, description will be made on the belt driving mechanism 40 installed in the laser printer 1.

Figure 2:
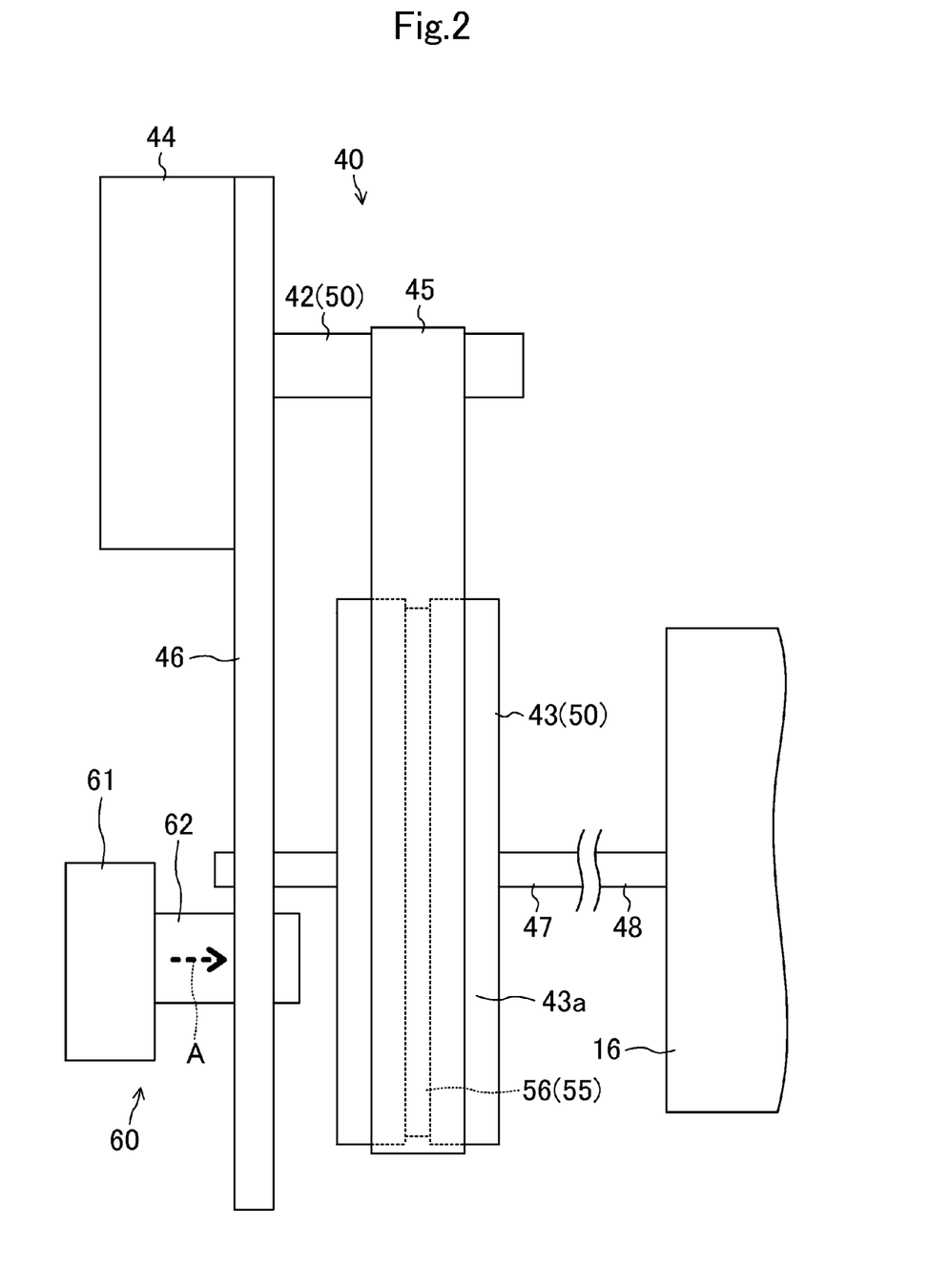
FIG. 2 is a front view showing a configuration of a belt driving mechanism according to a first embodiment.
Figure 3:
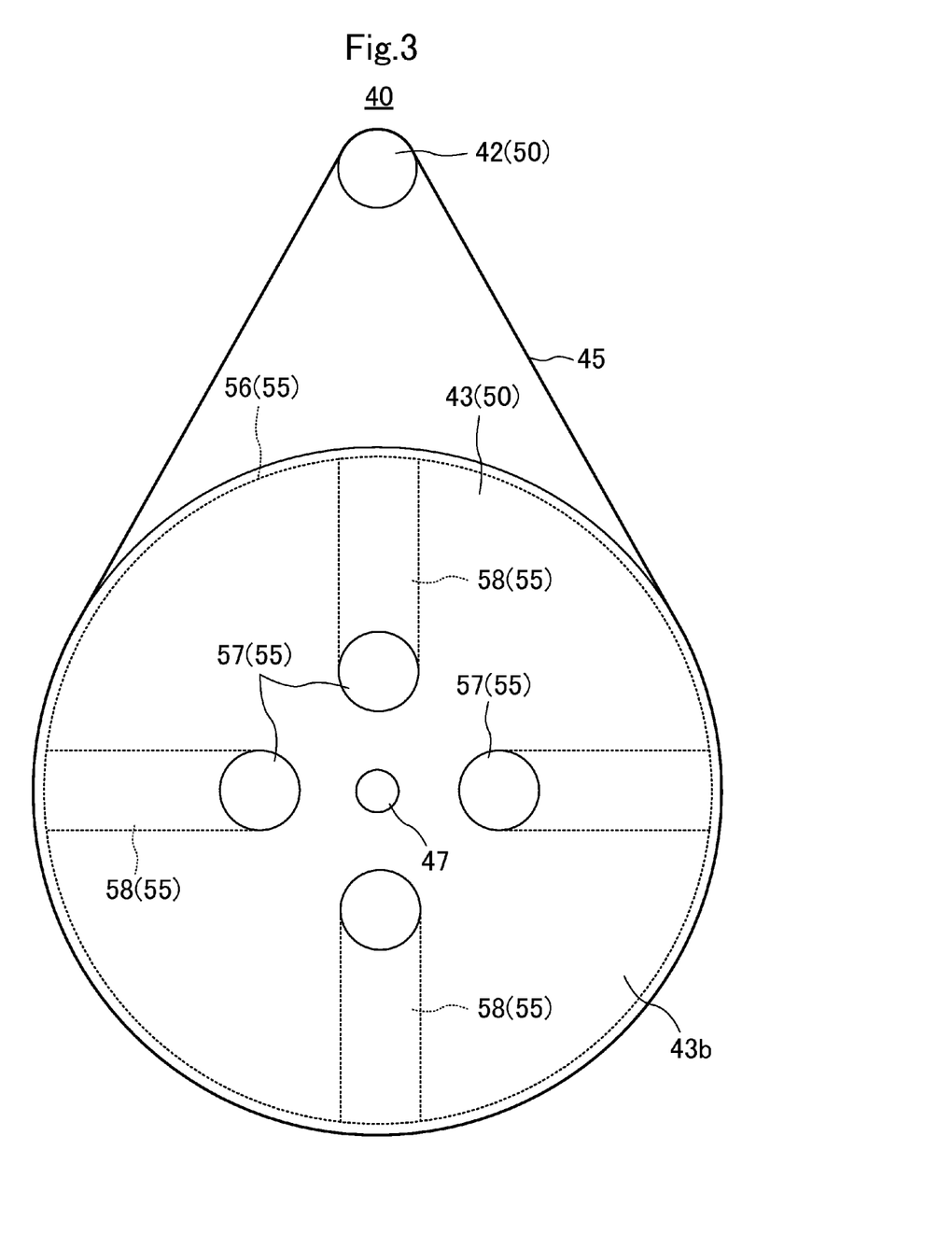
FIG. 3 is a side view showing the configuration of the belt driving mechanism according to the first embodiment.
Figure 4:
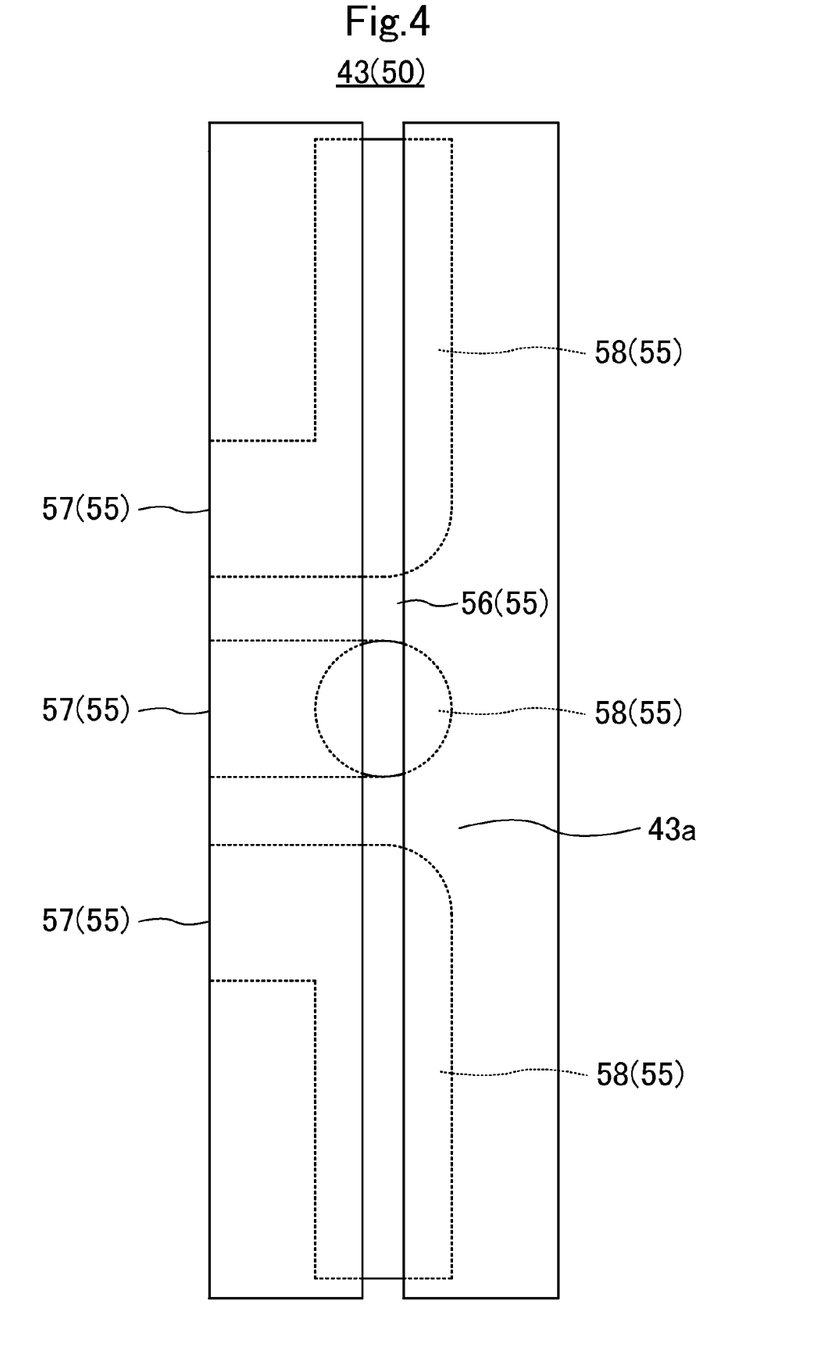
FIG. 4 is a front view showing a driven pulley according to the first embodiment.

FIG. 2 is a front view showing the configuration of the belt driving mechanism 40 according to a first embodiment. FIG. 3 is a side view showing the configuration of the belt driving mechanism 40. FIG. 4 is a front view showing a driven pulley.

As shown in FIGS. 2 and 3, the belt driving mechanism 40 includes a plurality of pulleys 50 and an endless belt 45 wound around the plurality of pulleys 50.

The plurality of pulleys 50 includes a driving pulley 42 and a driven pulley 43. The belt driving mechanism 40 of the present embodiment includes, e.g., one driving pulley 42 and one driven pulley 43.

The belt driving mechanism 40 includes a motor 44 for rotationally driving the driving pulley 42. The motor 44 is held by a holding member 46. An output shaft (not shown) of the motor 44 is rotatably supported by the holding member 46.

The driving pulley 42 is connected and fixed to the output shaft of the motor 44. For instance, the driving pulley 42 is made of a metallic material. On the other hand, the driven pulley 43 is made of a hard resin capable of enduring the sliding contact with a metal.

The driven pulley 43 includes an output shaft 47 which is a rotation shaft of the driven pulley 43. One end of the output shaft 47 is rotatably supported by the holding member 46. On the other hand, a shaft member 48 of the photosensitive drum 16 is connected to the other end of the output shaft 47.

Thus, the driving power of the motor 44 is delivered to photosensitive drum 16 through the driving pulley 42, the belt 45, the driven pulley 43, the output shaft 47 of the driven pulley 43 and the shaft member 48 of the photosensitive drum 16. Consequently, the photosensitive drum 16 is rotated and controlled by the belt driving mechanism 40.

In this regard, the belt 45 is made of a metallic material. The belt 45 is preferably made of, e.g., martensitic stainless steel or austenitic stainless steel. The belt 45 made of martensitic stainless steel has high strength. The belt 45 made of austenitic stainless steel has high toughness.

The thickness of the belt 45 is 20 µm or more and 40 µm or less. If the thickness of the belt 45 is less than 20 µm, the belt 45 may be deformed by a rotational load. On the other hand, if the thickness of the belt 45 is more than 40 µm, the belt 45 may not be able to endure the large bending stresses applied during the travel of the belt 45 and may be ruptured. Accordingly, it is preferred that the belt 45 has a thickness of 20 µm or more and 40 µm or less.

As shown in FIG. 3, at least one of the pulleys 50 includes an air supply portion 55 for supplying an air from the interior of the pulley 50 toward the belt 45 wound around the pulley 50. The air supply portion 55 of the present embodiment includes a groove 56, a plurality of openings 57 and a plurality of communication paths 58. The groove 56 is formed on an outer circumferential surface 43a of the driven pulley 43 to extend in the circumferential direction of the driven pulley 43. The openings 57 are formed on a side surface 43b of the driven pulley 43. The communication paths 58 bring the openings 57 and the groove 56 into communication with each other.

The openings 57 are arranged in a central region of the circular side surface 43b of the driven pulley 43. For example, four openings 57 can be disposed at a regular interval in the circumferential direction of the driven pulley 43.

As shown in FIG. 4, the groove 56 is disposed in a transverse central position of the driven pulley 43. The groove 56 is annularly formed along the outer circumferential surface 43a of the driven pulley 43. The width of the groove 56 is narrower than the width of the belt 45.

The communication paths 58 are formed within the driven pulley 43. The communication paths 58 extend from the openings 57 to the transverse central position of the driven pulley 43 and then extend radially outward along the driven pulley 43, thereby leading to the groove 56. The communication paths 58 are formed to have, e.g., a circular cross section.

As shown in FIG. 2, the belt driving mechanism 40 further includes a blower unit 60 for introducing an air into the openings 57. The blower unit 60 includes a fan 61, e.g., a sirocco fan or the like, and a duct 62. The duct 62 is disposed such that one end of the duct 62 is connected to the fan 61 with the other end thereof facing the openings 57 of the driven pulley 43. The duct 62 is held by the holding member 46.

With the belt driving mechanism 40 described above, upon operating the motor 44, the driving pulley 42 rotates about the output shaft of the motor 44. Thus, the driving power of the motor 44 is delivered from the driving pulley 42 to the driven pulley 43 through the belt 45. As a result, the photosensitive drum 16 is rotated and controlled by way of the driven pulley 43. On the other hand, upon operating the fan 61, as indicated by an arrow A in FIG. 2, an air is blown toward the side surface 43b of the driven pulley 43 through the duct 62. Since the driven pulley 43 is under rotation, the openings 57 face the duct 62 one after another, at which time an air is introduced into the openings 57. The air introduced into the openings 57 is moved toward the groove 56 through the communication paths 58 and is supplied to the belt 45.

Therefore, according to the present embodiment, the air supply portion 55 of the driven pulley 43 supplies an air to the belt 45 wound around the driven pulley 43. This makes it possible to cool the belt 45.

Since the air supply portion 55 is configured by the openings 57, the communication paths 58 and the groove 56, all of which are formed in the driven pulley 43, the air blown from the fan 61 toward the side surface 43b of the driven pulley 43 through the duct 62 can be suitably supplied to the belt 45 via the openings 57, the communication paths 58 and the groove 56.

Accordingly, the running belt 45 can be suitably cooled. It is therefore possible to suppress thermal expansion of the belt 45, thereby making the circumference of the belt 45 hard to change. As a result, it is possible to increase the accuracy of belt driving control.

Since the driven pulley 43 of the present embodiment is provided with the openings 57, the communication paths 58 and the groove 56 as mentioned above, an air can be suitably supplied to the belt 45 through the openings 57, the communication paths 58 and the groove 56. Accordingly, if the driven pulley 43 is applied to the belt driving mechanism 40, it becomes possible to accurately perform belt driving control.

Since the laser printer 1 according to the present embodiment is provided with the belt driving mechanism 40 which includes the driven pulley 43, the accuracy of belt driving control performed by the belt driving mechanism 40 grows higher. This makes it possible to accurately form an image.

Second Embodiment

Figure 5:
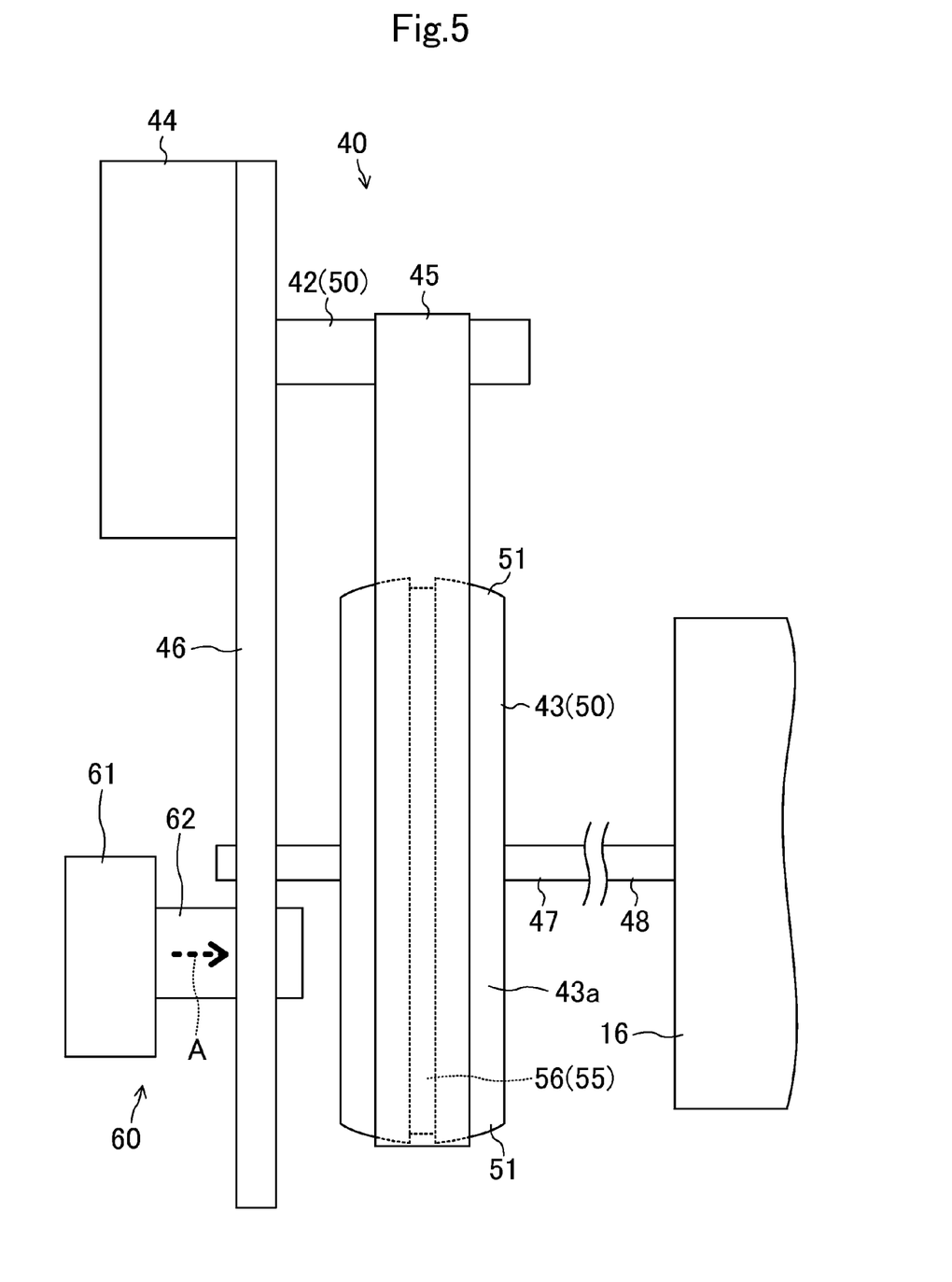
FIG. 5 is a front view showing a configuration of a belt driving mechanism according to a second embodiment.
Figure 6:
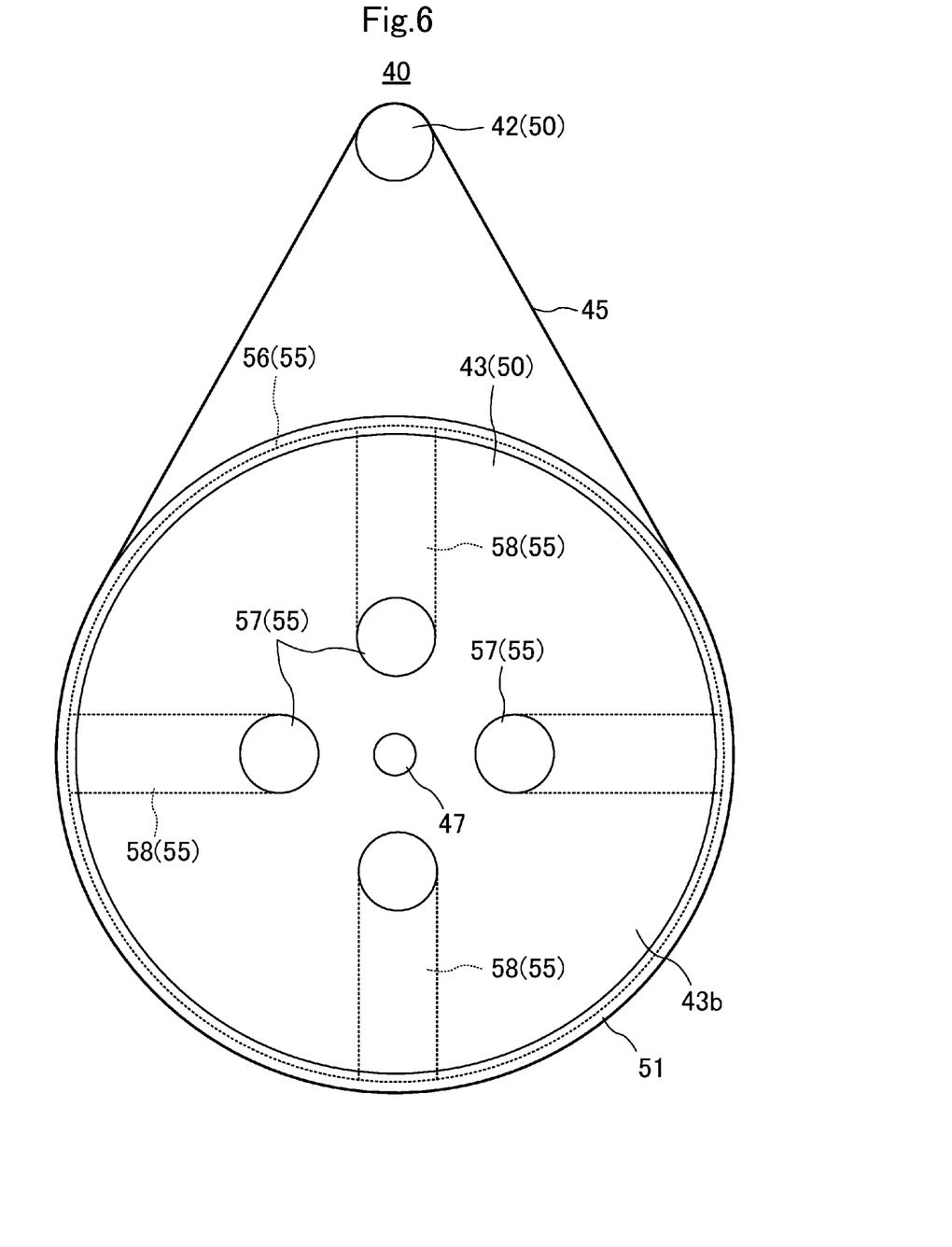
FIG. 6 is a side view showing the configuration of the belt driving mechanism according to the second embodiment.
Figure 7:
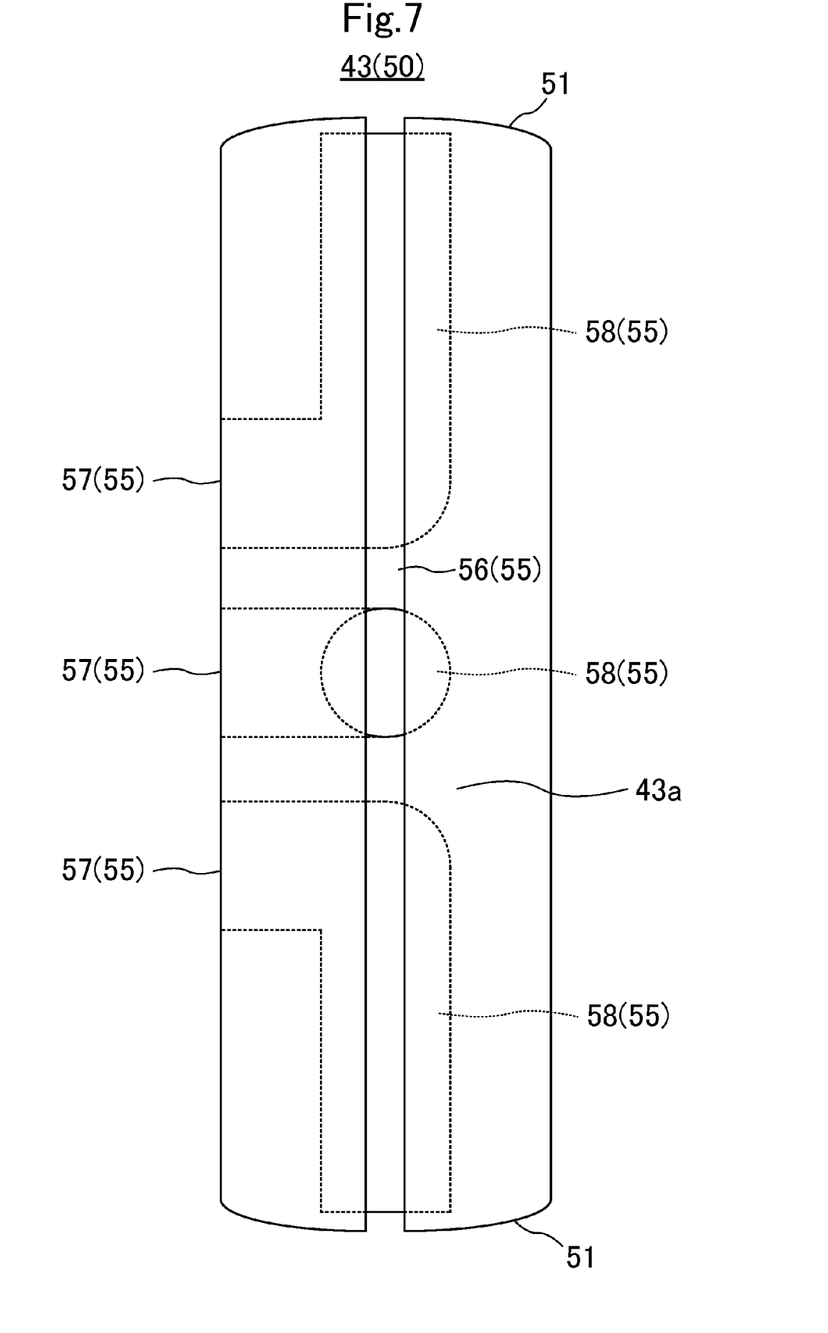
FIG. 7 is a front view showing a driven pulley according to the second embodiment.

FIG. 5 is a front view showing a configuration of a belt driving mechanism according to a second embodiment. FIG. 6 is a side view showing the configuration of the belt driving mechanism according to the second embodiment. FIG. 7 is a front view showing a driven pulley. In the embodiments described below, the portions identical with those shown in FIGS. 1 to 4 will be designated by like reference symbols and will not be described in detail.

The belt driving mechanism 40 of the present embodiment differs from the belt driving mechanism 40 of the first embodiment in terms of the configuration of the outer circumferential surface 43a of the driven pulley 43.

That is to say, as shown in FIGS. 5 to 7, the driven pulley 43 of the present embodiment provided with the air supply portion 55 includes a bulging portion 51 formed on the outer circumferential surface 43a thereof. The bulging portion 51 is formed to bulge radially outward from the driven pulley 43. The bulging portion 51 is formed over the entirety (entire circumference) of the outer circumferential surface 43a of the driven pulley 43.

For example, the bulging portion 51 has a crowning shape. The crowing shape of the bulging portion 51 is set such that the protruding amount thereof gradually decreases from the center of the bulging portion 51 in the transverse (left-right, in FIG. 7) direction of the driven pulley 43 toward the opposite sides of the bulging portion 51 in the transverse direction of the driven pulley 43.

The bulging portion 51 is not limited to the shape shown in FIG. 5 but may have such a shape that the protruding amount thereof gradually increases from one side toward the other side in the transverse direction of the driven pulley 43.

As shown in FIG. 7, the groove 56 is disposed in a transverse central position of the driven pulley 43. The groove 56 is annularly formed along the outer circumferential surface 43a of the driven pulley 43. The width of the groove 56 is narrower than the width of the belt 45.

According to the present embodiment, just like the aforementioned first embodiment, the air supply portion 55 is formed in the driven pulley 43. It is therefore possible to suitably cool the running belt 45, thereby increasing the accuracy of belt driving control.

In addition, since the bulging portion 51 is formed in the entirety of the outer circumferential surface 43a of the driven pulley 43 provided with the air supply portion 55, it is possible for the bulging portion 51 to restrain the belt 45 wound around the driven pulley 43 from moving in the transverse direction of the driven pulley 43. Accordingly, it is possible to suppress meandering of the belt 45 and derailment of the belt 45 from the pulleys 50.

However, the contact area of the driven pulley 43 provided with the bulging portion 51 and the belt 45 is relatively small. Therefore, the contact portion of the driven pulley 43 and the belt 45 is heated. This tends to incur thermal expansion of the belt 45. In contrast, according to the present embodiment, the belt 45 can be cooled by the air supplied from the air supply portion 55. Therefore, even if the bulging portion 51 is formed in the driven pulley 43, it is possible to suppress thermal expansion of the belt 45, thereby making the circumference of the belt 45 hard to change. As a result, it is possible to secure the running stability of the belt 45 and to further increase the accuracy of belt driving control.

Third Embodiment

Figure 8:
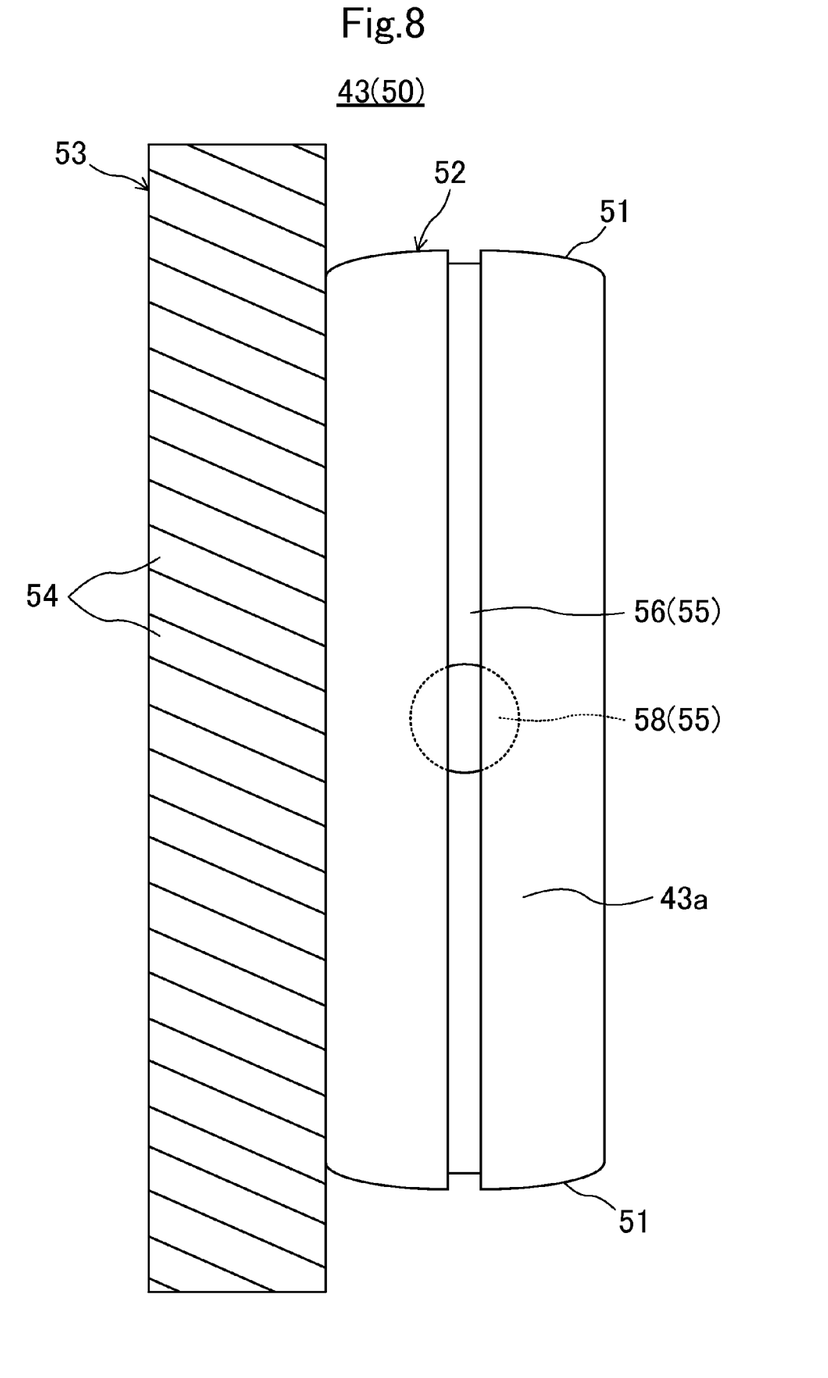
FIG. 8 is a front view showing a driven pulley according to a third embodiment.
Figure 9:
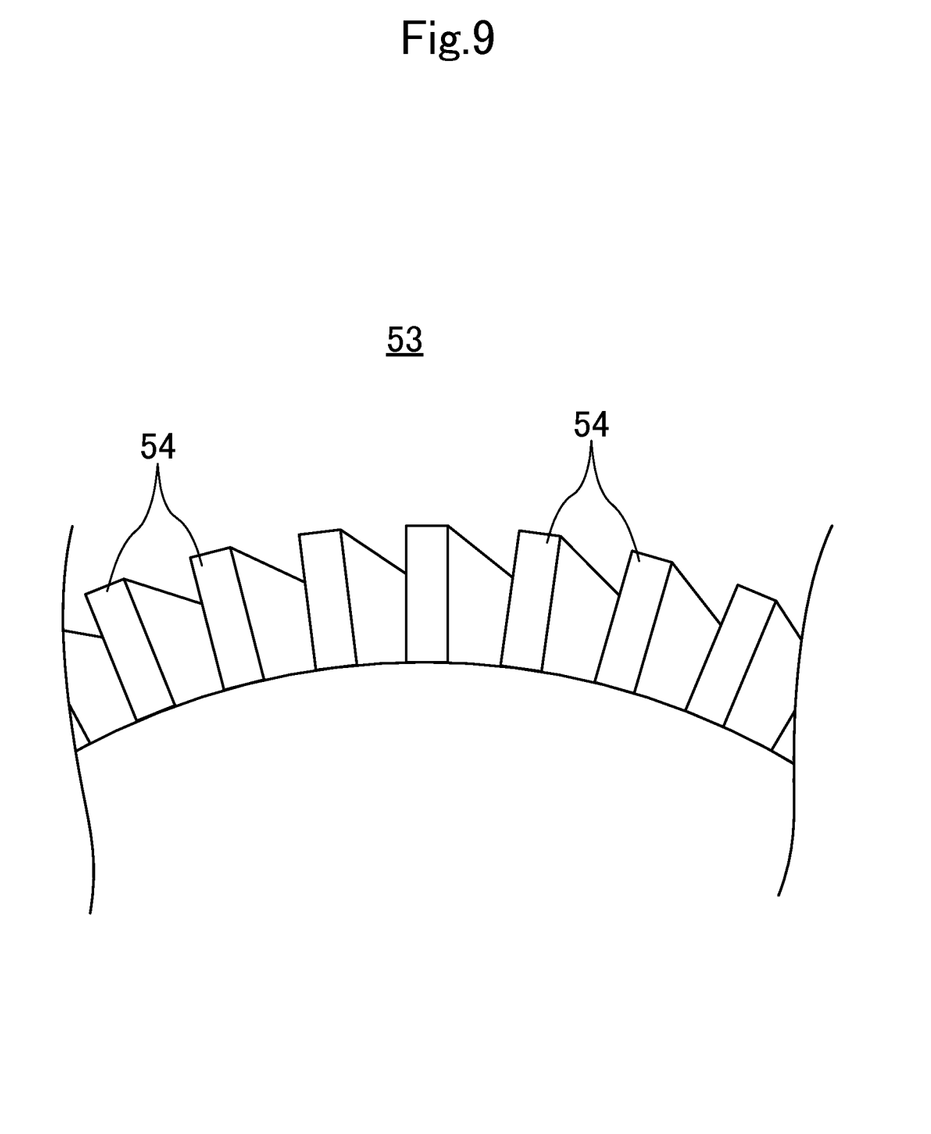
FIG. 9 is a partially-enlarged perspective view showing a fin portion.

FIG. 8 is a front view showing a driven pulley according to a third embodiment. FIG. 9 is a partially-enlarged perspective view showing a fin portion.

The belt driving mechanism 40 of the present embodiment differs from the belt driving mechanism 40 of the second embodiment in that the driven pulley 43 further includes a configuration for enhancing the heat dissipation of the driven pulley 43.

That is to say, as shown in FIGS. 8 and 9, the driven pulley 43 of the present embodiment including the air supply portion 55 is made of a metallic material and is provided with heat radiating fins 54.

As shown in FIG. 8, the driven pulley 43 of the present embodiment includes a pulley body 52 made of a metal and a fin portion 53 unitarily installed on one side surface of the pulley body 52. The fin portion 53 is made of a metallic material just like the pulley body 52. As shown in FIG. 9, a plurality of heat radiating fins 54 is formed in the fin portion 53. The heat radiating fins 54 as a whole can be formed into, e.g., a fan-like shape.

According to the present embodiment, as with the aforementioned second embodiment, the driven pulley 43 is provided with the air supply portion 55 and the bulging portion 51, whereby the movement of the belt 45 in the transverse direction of the pulley can be restrained by the bulging portion 51, while suitably cooling the running belt 45. Accordingly, it is possible to secure the running stability of the belt 45 and to further increase the accuracy of belt driving control.

In addition, the pulley body 52 and the fin portion 53 made of a metallic material are relatively high in the heat transfer property. Therefore, the temperature of the driven pulley 43 can be easily reduced by the heat radiating fins 54. Accordingly, the belt 45 cooled by the air supply portion 55 can be further effectively cooled by the driven pulley 43 having a reduced temperature.

The fin portion 53 may be disposed at the same side of the pulley body 52 as the duct 62. By doing so, the driven pulley 43 can be effectively cooled by the air blown from the duct 62. In this case, the openings 57 are formed on the side surface of the fin portion 53, and the communication paths 58 are formed over the fin portion 53 and the pulley body 52.

The fin portion 53 may be disposed at the opposite side of the pulley body 52 from the duct 62. By doing so, as compared with the case where the fin portion 53 is disposed at the same side of the pulley body 52 as the duct 62, the length of the communication paths 58 becomes shorter and the air resistance in the communication paths 58 decreases. It is therefore possible to efficiently supply the air to the belt 45.

In the present embodiment, description has been made on an example in which the driven pulley 43 includes the bulging portion 51. However, as with the first embodiment, the driven pulley 43 may be configured not to include the bulging portion 51.

Other Embodiments

The air supply portion 55 is not limited to the groove 56, the openings 57 and the communication paths 58 described above, but may have other configurations which can supply an air from the interior of the pulley 50 toward the belt 45.

Likewise, the blower unit 60 may be configured to introduce an air into the openings 57 using a configuration other than the fan 61 and the duct 62.

In the first to third embodiments, description has been made on an example in which the air supply portion 55 is formed in the driven pulley 43. However, the air supply portion 55 may be formed in the driving pulley 42 or may be formed in both the driven pulley 43 and the driving pulley 42.

In the second and the third embodiments, it is only necessary that the bulging portion 51 be formed on the entire outer circumferential surface of at least one of the pulleys 50. Therefore, for example, the bulging portion 51 may be formed only in the driving pulley 42 or may be formed in both the driving pulley 42 and the driven pulley 43.

In the aforementioned embodiments, the laser printer 1 has been described as one example of the belt driving apparatus. However, the belt driving apparatus is not limited to the laser printer 1 but may be other apparatuses such as a copier, a scanner, a multifunction peripheral, a pinhole machine, and so forth. It goes without saying that the belt driving apparatus can be applied to an electronic apparatus which is driven by a belt.

What is claimed is:

1. A belt driving mechanism, comprising:
    a plurality of pulleys including a driving pulley and a driven pulley;
    a belt wound around the pulleys and made of a metallic material; and
    a blower unit,
    wherein at least one of the pulleys includes an air supply portion for supplying air from an interior of the at least one of the pulleys toward the belt wound around the pulleys,
    wherein the at least one of the pulleys formed with the air supply portion includes a bulging portion formed on an entire outer circumferential surface of the at least one of the pulleys so as to bulge radially outward from the at least one of the pulleys,
    wherein the air supply portion includes a groove formed on the outer circumferential surface of the at least one of the pulleys to extend in a circumferential direction of the at least one of the pulleys, a plurality of openings formed on a side surface of the at least one of the pulleys at intervals in the circumferential direction of the at least one of the pulleys, and a communication path which brings the plurality of openings and the groove into communication with each other,
    wherein the blower unit introduces air into the plurality of openings,
    wherein the blower unit includes a fan and a duct disposed such that one end of the duct is connected to the fan and another end of the duct faces the side surface of the at least one of the pulleys, and
    wherein, when the at least one of the pulleys formed with the air supply portion is under rotation, the openings face the other end of the duct one after another, at which time the air is introduced into each of the openings.

2. A belt driving apparatus, comprising the belt driving mechanism of claim 1.

3. A pulley for which a metallic belt is wound around, the pulley comprising:
    an air supply portion for supplying air from an interior of the pulley toward the metallic belt wound around the pulley; and
    a bulging portion formed on an entire outer circumferential surface of the pulley so as to bulge radially outward from the pulley,
    wherein the air supply portion includes a groove formed on the outer circumferential surface of the pulley to extend in a circumferential direction of the pulley, a plurality of openings formed on a side surface of the pulley at intervals in the circumferential direction of the pulley, and a communication path which brings the plurality of openings and the groove into communication with each other,
    wherein air is introduced into the plurality of openings with a blower unit,
    wherein the blower unit includes a fan and a duct disposed such that one end of the duct is connected to the fan and another end of the duct faces the side surface of the pulley, and
    wherein, when the pulley is under rotation, the openings face the other end of the duct one after another, at which time the air is introduced into each of the openings.

* * * * *